US008757853B2

(12) United States Patent
Robert et al.

(10) Patent No.: US 8,757,853 B2
(45) Date of Patent: Jun. 24, 2014

(54) METHOD FOR CONTROLLING A VEHICLE HEADLAMP

(75) Inventors: Caroline Robert, Paris (FR); Patrick Bonhoure, Annemasse (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 12/893,066

(22) Filed: Sep. 29, 2010

(65) Prior Publication Data

US 2011/0075435 A1    Mar. 31, 2011

(30) Foreign Application Priority Data

Sep. 29, 2009 (FR) ..................... 09 56742

(51) Int. Cl.
| B60Q 1/00 | (2006.01) |
| F21V 21/28 | (2006.01) |
| F21V 21/29 | (2006.01) |
| F21V 1/00 | (2006.01) |
| B60Q 3/00 | (2006.01) |

(52) U.S. Cl.
USPC ............ 362/464; 362/465; 362/466; 362/538

(58) Field of Classification Search
USPC .................... 362/464, 465, 466, 538
See application file for complete search history.

(56) References Cited

U.S. PATENT DOCUMENTS

| 6,578,993 | B2 * | 6/2003 | Kobayashi et al. ........... 362/466 |
| 6,633,027 | B2 * | 10/2003 | Kobayashi et al. ........ 250/208.1 |
| 6,960,005 | B2 * | 11/2005 | Daicho et al. ................ 362/466 |
| 7,036,963 | B2 * | 5/2006 | Fukawa ........................ 362/465 |
| 7,226,193 | B2 | 6/2007 | Bahnmuller et al. |
| 7,415,338 | B2 * | 8/2008 | Monji et al. .................... 701/49 |
| 7,425,085 | B2 * | 9/2008 | Mizuno et al. ................ 362/465 |
| 7,477,976 | B2 * | 1/2009 | Horii et al. ..................... 701/49 |
| 7,503,677 | B2 * | 3/2009 | Morishita ..................... 362/466 |
| 7,511,440 | B2 * | 3/2009 | Goto et al. .................... 318/286 |
| 7,568,822 | B2 * | 8/2009 | Ibrahim ........................ 362/466 |
| 7,575,348 | B2 * | 8/2009 | Hasegawa ..................... 362/466 |
| 2005/0052879 | A1 | 3/2005 | Bahnmuller et al. |
| 2005/0122726 | A1 * | 6/2005 | Yamamoto et al. ........... 362/464 |
| 2007/0147055 | A1 * | 6/2007 | Komatsu ....................... 362/464 |
| 2008/0130302 | A1 * | 6/2008 | Watanabe ..................... 362/466 |
| 2008/0192496 | A1 * | 8/2008 | Mochizuki et al. ........... 362/466 |
| 2008/0239735 | A1 * | 10/2008 | Ishiguro ....................... 362/466 |
| 2009/0034276 | A1 * | 2/2009 | Mueller et al. ................ 362/466 |
| 2009/0231867 | A1 | 9/2009 | Mochizuki et al. |

FOREIGN PATENT DOCUMENTS

| DE | 102004026154 A1 | 12/2005 |
| DE | 102005038581 A1 | 3/2007 |
| EP | 2100769 A2 | 9/2009 |
| EP | 2119593 A1 | 11/2009 |
| JP | 2006298285 A | 11/2006 |
| JP | 2009046118 A | 3/2009 |

* cited by examiner

*Primary Examiner* — Jong-Suk (James) Lee
*Assistant Examiner* — Bryon T Gyllstrom
(74) *Attorney, Agent, or Firm* — Jacox, Meckstroth & Jenkins

(57) ABSTRACT

A system and method for controlling a vehicle headlamp, the headlamp being equipped with an automatic switching unit between high beam and low beam lighting modes and with a bending light function (DBL). The method comprises a step of making the bending light function (DBL) change from a first active state to a second state for detecting a combination of conditions comprising an active state of the automatic switching unit between high beam and low beam lighting modes and an active state of the high beam lighting mode.

23 Claims, 3 Drawing Sheets

| number of proposition | automatic switching state | high beam lighting mode state | steering wheel rotation | steering wheel angle radius <60 metres | curve of navigation system radius <60 metres | proposition of effect on DBL |
|---|---|---|---|---|---|---|
| 1 | activated | activated | not used | not used | not used | not activated |
| 2 | activated | activated | yes | yes | not used | not activated |
| 2 | activated | activated | not used | not used | yes | not activated |
| 2 | activated | activated | yes | yes | yes | not activated |
| 3 | activated | activated | yes | not used | not used | Change DBL logic |

FIG. 5

METHOD FOR CONTROLLING A VEHICLE HEADLAMP

CROSS-REFERENCE TO RELATED APPLICATIONS

This application claims priority to French Application No. 0956742 filed Sep. 29, 2009, which application is incorporated herein by reference and made a part hereof.

BACKGROUND OF THE INVENTION

1. Field of the Invention

The invention relates to a motor vehicle low beam and bending light headlamp. The invention also relates to a vehicle equipped with such a headlamp.

2. Description of the Related Art

The field of the invention is, generally, that of motor vehicle headlamps. In this field, various types of headlamp devices are known, which primarily include:

parking lights of low intensity and low range;

dipped or low beam lights of higher intensity and of a range on the road approaching 70 meters, which are mainly used at night and the light beam distribution of which is such that it is possible not to dazzle the driver of an oncoming vehicle;

long range high beam lights, the zone of vision of which on the road is near to 200 meters, and which must be turned off when passing another vehicle in order not to dazzle its driver;

fog-lights; and dual-mode headlamps, which combine the functions of dipped lights and long range lights.

However, traditional headlamp devices which have just been described, more particularly high beam long range lights, produce light beams which are adaptable when these headlamp devices are used under certain conditions. Thus, a driver is sometimes confronted with situations in which the light beam produced by the low beam lights of his/her vehicle in their traditional configuration could be orientated and distributed in a better way to approach such situations; traditional configuration of a low beam type device is understood to mean the configuration which they are in when they do not have advanced functions, certain examples of which will be mentioned below.

For example, when a vehicle approaches a bend, the headlamps continue to illuminate straight in front of them whereas it would be more sensible to orientate the light beam in the direction of the bend being negotiated.

For this purpose, in addition to the principal functions of traditional, in particular low beam and high beam headlamps, various improvements have gradually appeared. Thus, the development has been seen of elaborate functions, or advanced functions, which include in particular DBL (dynamic bending light) headlamps, here also called headlamps with a bending light function, which enable the orientation of a light beam produced by a light source to be modified, so that when the vehicle approaches a bend, the road is illuminated in an optimum way.

Turning headlamps are understood to mean, in particular, headlamps configured to be able to turn.

On the other hand, the vehicle is also equipped with a system to detect obstacles. This can involve projecting a motif or extracting an object in an image of a camera-based system enabling headlights of oncoming vehicles to be detected.

If the vehicle is equipped with an automatic switching unit between the high beam and low beam lighting modes, and if the high beam lighting mode is in an active state, the camera has a second function: to switch off the high beam lighting mode when a car is detected on the road so as not to dazzle the driver.

The automatic switching systems between the high beam and low beam lighting modes use a camera with a fixed field of view and position. Thus, in certain situations, the oncoming vehicle is unable to appear in the field of view of the camera and therefore cannot to be detected and even so can already be in the high beam of the vehicle equipped with automatic switching between low and high beam. This results in a potential situation of dazzling the driver of the oncoming vehicle. This phenomenon can be worsened by the presence on the vehicle of a DBL bending light function.

When the DBL bending light function is in a default state, the beam of the camera and that of the headlamps essentially cover the same field. A default state is understood to mean the configuration which the headlamps are in when no bend in the road is detected. Obviously, if the DBL function makes the high beams of the headlamps turn after a bend is detected, the beam of the camera, which is fixed and always parallel to the vehicle's direction of travel, and the turning beam of the headlamps diverge from one another, likely to dazzle the drivers of oncoming vehicles since the camera cannot detect certain obstacles.

There is, therefore, a need to provide a system and method for controlling a headlight.

SUMMARY OF THE INVENTION

In addition, it is necessary to provide a lighting system for a vehicle, equipped with automatic switching between a high and low beam and with headlamps with a turning beam, which is not liable to dazzle the drivers of oncoming vehicles when a bend in the road is detected.

One object of the present invention is to resolve the problem which has just been mentioned.

One embodiment of the invention thus primarily relates to a method for controlling at least one beam of a vehicle's headlamp, the vehicle being equipped with an automatic switching unit between high beam and low beam lighting modes and with a DBL bending light function, wherein the method comprises the step of making the DBL bending light function change from a first active state to at least a second state for detecting a combination of conditions comprising an active state of the automatic switching unit between high beam and low beam lighting modes and an active state of the high beam lighting mode.

Advantageously, the first state of the DBL bending light function is a default state. A default state is understood to mean a configuration, which the DBL bending light function is systematically in, unless a contrary command opposes it.

In addition, the first state, in which the DBL function is active, can respond to the bending light logic usually used for a DBL system. The first state is therefore a standard state.

The second state of the DBL bending light function can be an active state different from the first state or an inactive state.

The combination of conditions can comprise a steering wheel angle. The combination of conditions can also comprise detecting a bend with an amplitude greater than a predetermined value.

The value of the curve radius can be deduced from the value of the angle at the steering wheel. This value and its sign (bend to the right/bend to the left) are traditionally directly read on the CAN (controller area network) of the vehicle. The value and its sign are different depending on the vehicle.

The value of the curve radius of the bend can also be derived by means of GPS cartography. The latter contains data about the geometry of the road.

It is finally possible to combine data from the GPS cartography and from the CAN of the vehicle (angle at the steering wheel) in order to anticipate a bend (use of cartography) and then confirm the data (angle at the steering wheel).

Greater confidence can be attributed to the value of the curve radius if the two sources of data are used simultaneously.

Preferably but not necessarily, the invention deals with bends having a curve radius of less than 54 meters, which corresponds to a safe speed of 50 km/h.

Preferably, in particular when a tight bend is detected, the low beam and high beam lights are lit and, at the same time, the bending light function is activated.

Other embodiments of the invention relate to a road lighting system that comprising:

a headlamp comprising a DBL bending light function to illuminate the road in the bends;

a microcontroller being connected to a data network of the vehicle and controlling the orientation of said headlamp;

a camera able to supply obstacle detection data with minima, detection of "oncoming and leading" vehicles, and located in front of the vehicle;

an automatic switching unit between high beam and low beam lighting modes receiving data from the camera; and the bending light function (DBL) comprising control means configured to make it change from a first active state to a second state for detecting a combination of conditions comprising an active state of the automatic switching unit between high beam and low beam lighting modes and an active state of the high beam lighting mode.

Another embodiment of the invention relates to a method for controlling two vehicle headlamps, the headlamps being equipped with an automatic switching unit between high beam and low beam lighting modes and with a bending light function (DBL), comprising a step consisting in making the bending light function (DBL) change from a first active state to at least a second state for detecting a combination of conditions comprising an active state of the automatic switching unit between high beam and low beam lighting modes and an active state of the high beam lighting mode, and the second state is defined by rotation of the beam of a first headlamp at a first angle and by rotation of the beam of the second headlamp at a second angle different from the first angle.

Another embodiment of the invention relates to a method for controlling two vehicle headlamps, the headlamps being equipped with an automatic switching unit between high beam and low beam lighting modes and with a bending light function (DBL), comprising a step consisting in making the bending light function (DBL) change from a first active state to at least a second state for detecting a combination of conditions comprising an active state of the automatic switching unit between high beam and low beam lighting modes and an active state of the high beam lighting mode, and the second state is defined by rotation of the beam of the first headlamp and the absence of rotation of the beam of the second headlamp.

The invention and its various applications will be understood better upon reading the description below and upon examining the figures which accompany it. These are presented only as an indication and by no means limit the invention.

BRIEF DESCRIPTION OF THE ACCOMPANYING DRAWINGS

FIGS. 1A and 1B schematically illustrate a vehicle equipped with a camera to detect obstacles without the DBL function (FIG. 1A) and with the DBL function (FIG. 1B);

FIG. 5 illustrates a table which as a non-restrictive example summarizes different embodiments according to the invention.

DETAILED DESCRIPTION OF THE PREFERRED EMBODIMENTS

As will be seen in detail below, the system and method according to the embodiment of the invention being described will prevent a driver of an oncoming vehicle (that is to say, travelling in the opposite direction to the vehicle considered) being dazzled by the headlamps of the vehicle considered.

The oncoming vehicle can be of any type. The invention also applies to other obstacles such as pedestrians.

A motor vehicle is understood to mean any vehicle comprising an engine.

Figure 1A:
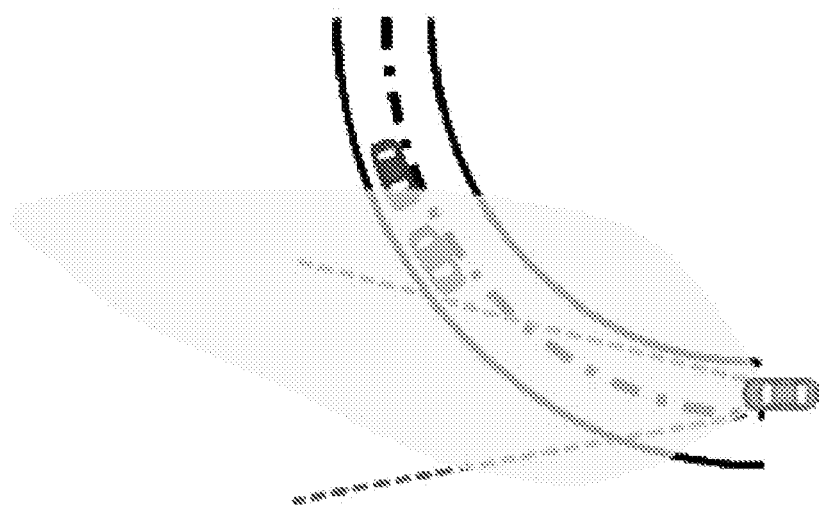

FIG. 1A shows a motor vehicle equipped with an automatic switching system between the two low beam and high beam lighting modes. These systems use a camera with a fixed field of view defined in FIG. 1A by dotted lines. The camera is fixed.

The vehicle equipped with an automatic switching unit between the high beam and low beam lighting modes, having the high beam lighting mode in an active state, then switches off the high beam lighting mode when a car is detected in the field of the camera so as not to dazzle the driver of the oncoming vehicle.

Since the camera has a fixed field of view and position, the oncoming vehicle is unable to appear in the field of view of the camera, particularly in the bends, and thus cannot be detected, and even so can already be in the high beam of the vehicle equipped with automatic switching between low beam and high beam. This results in a potential situation of dazzling the driver of the oncoming vehicle as illustrated in FIG. 1A.

The beams of the headlamps of the car illustrated in FIG. 1A are non-turning; the headlamps therefore do not have the advanced DBL bending light function.

Figure 1B:
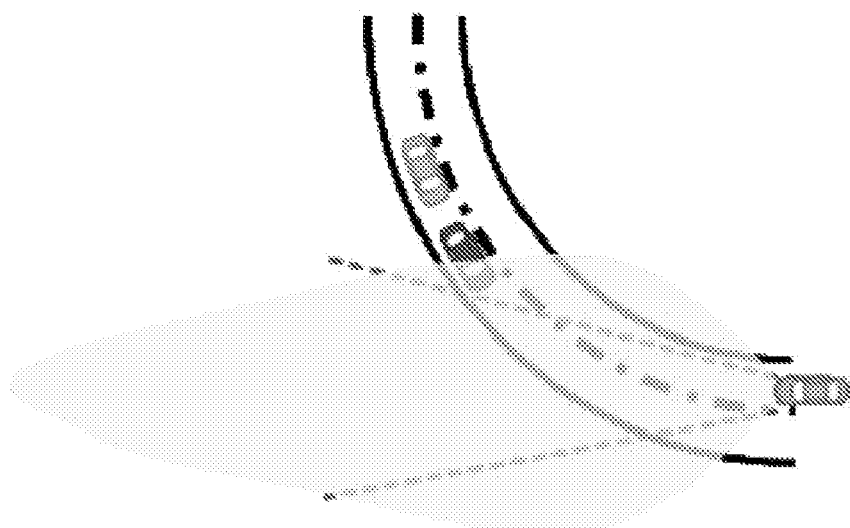

The vehicle illustrated in FIG. 1B, however, is equipped with headlamps with turning beams also referred to as the DBL bending light function. The vehicle is also provided with the automatic switching system between the low beam and high beam lighting modes and with the camera to detect obstacles which sends signals to the switching system for detecting an obstacle (oncoming vehicle), in order to change from the high beam mode, if the latter is active, to the low beam mode.

In a bend or a curve in the road, the DBL function being active, makes the headlamps turn following the curve. The result is a situation in which the driver of the oncoming vehicle is dazzled. This dazzling illustrated in FIG. 1B is much more serious than that in FIG. 1A, since the field of the high beam of the headlamps is more offset from the field of view of the fixed camera, thus the driver will be in the dazzling beam longer before being back in the field of view of the camera (and, in addition, it is known that dazzling is directly related to the length of time during which the driver is subjected to optical radiation). Moreover, the potentially dazzled driver is nearer to the axis of the beams, therefore the illumination perceived is greater, the luminous intensity emitted increasing in the direction of the beam center.

Figure 2:
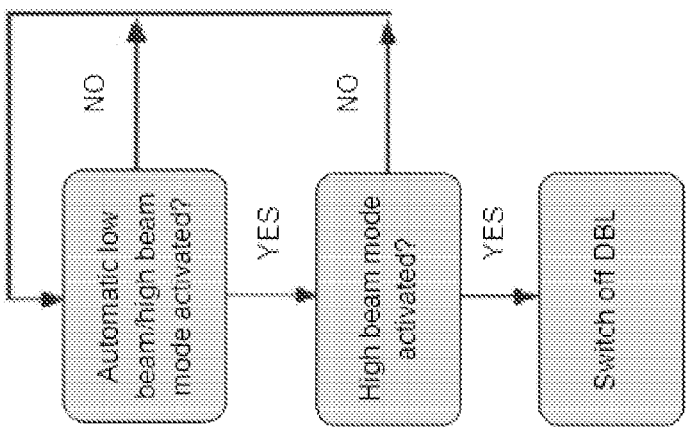
FIG. 2 illustrates a diagram of a first non-restrictive embodiment according to the invention.

To resolve the problem, according to a first embodiment illustrated in FIG. 2, the DBL bending light function is switched off when the automatic switching system between the high beam and low beam lighting modes is active and the headlamps are in high beam mode.

Thus, inadvertent dazzling is prevented while preserving the quality of lighting in low beam mode with use of the DBL bending light function.

Since the DBL function is switched off abruptly and the high beam mode is active by virtue of the automatic switching system between the high beam and low beam lighting modes, the first embodiment does not depend on the curve angles of the bends and bend detection is not necessary.

Figure 3:
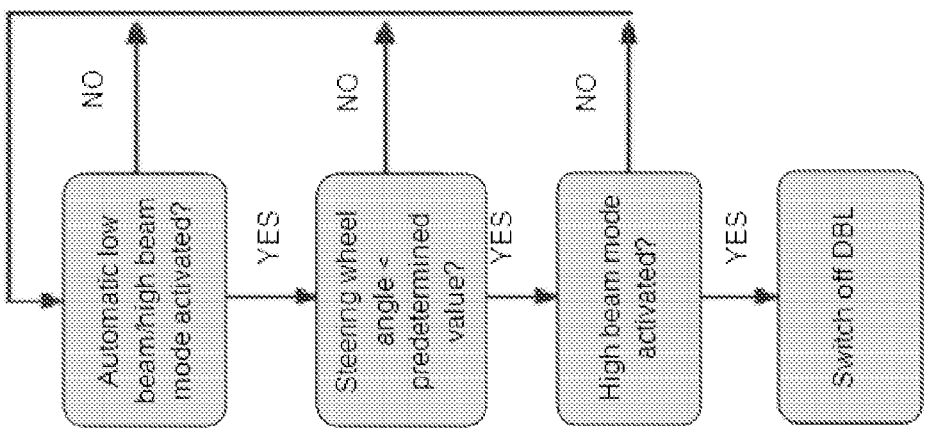
FIG. 3 illustrates a diagram of a second non-restrictive embodiment according to the invention.

According to a second embodiment illustrated in FIG. 3, the DBL bending light function is only switched off for certain bends. This is carried out by referring as an example to the angle at the steering wheel or a navigation system.

Thus, the DBL bending light function is switched off when the automatic switching system between the high beam and low beam lighting modes is active, the high beam mode is activated and the angle at the steering wheel is greater than a given value.

In one example, this predetermined value is equivalent to a curve radius of 60 meters.

The curve radius is generally calculated based on steering wheel angle data and/or data from the navigation system.

The DBL bending light function can also be switched off when the automatic switching system between the high beam and low beam lighting modes is active, the high beam mode is activated and the curve of a bend according to the navigation system is greater than a predetermined value.

Figure 4:
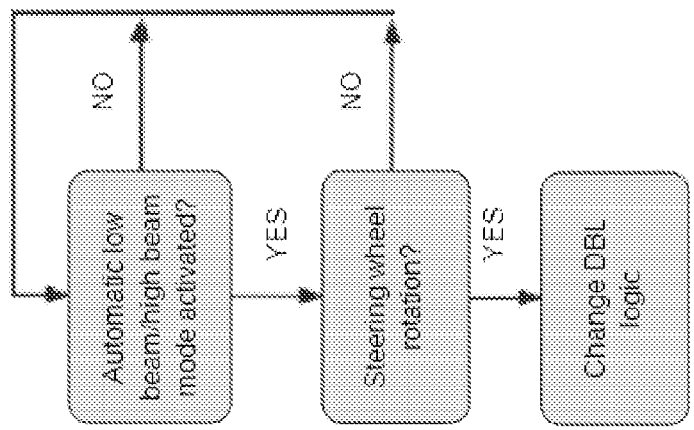
FIG. 4 illustrates a diagram of a third non-restrictive embodiment according to the invention.

According to a third embodiment illustrated in FIG. 4, the logic of the DBL bending light function is modified whenever the low beam lighting mode automatically changes to the high beam lighting mode.

Thus, if the automatic switching system between the high beam and low beam lighting modes is active and the high beam mode is activated, instead of switching off the DBL function in the bends measured, for example, depending on the rotation of the steering wheel, certain control logic of the DBL function is modified.

For example, if the vehicle is in high beam mode when detecting a bend, the rotation of one of the two headlamps is simply limited angularly, in order to obtain a beam wider than a beam in high beam mode while reducing the total luminosity. Although the beam always remains potentially dazzling, the impact of the beam is limited in the event of an oncoming vehicle, while driving comfort is increased since the beam is widened by rotation of a single headlamp or limitation of the rotation of the other headlamp.

The rotation of the beam of the headlamp is, for example, related to the radius of the osculatory circle of the curve in the road. It is calculated based on steering wheel angle data and/or by data from the navigation system.

If only one headlamp beam must turn in the last state, its selection is linked to the direction of the curve.

Alternatively, the two beams can be turning but at an angle which is different in each case. Thus, the potential risks of dazzling oncoming vehicles are reduced.

In another embodiment, if the automatic switching system between the high beam and low beam lighting modes is active and the high beam mode is activated, the DBL function can be switched off for detecting a combination of certain conditions and modified for detecting a combination of other conditions.

In another embodiment, if the automatic switching system between the high beam and low beam lighting modes is active and the high beam mode is activated, the DBL function logic can be modified for detecting a combination of certain conditions and modified differently for detecting a combination of other conditions.

Thus, a plurality of second states corresponding to a plurality of combinations of conditions can be defined.

FIG. 5 shows a table which summarizes various embodiments according to the invention. The first line, according to a first embodiment, shows that the DBL bending light function is switched off when the automatic switching system between the high beam and low beam lighting modes is active and the headlamps are in high beam mode (high beam lighting mode activated state). The words "not used" indicate that the parameter is not used in this case.

In the second to the fourth line, according to a second embodiment, the automatic switching system between the high beam and low beam lighting modes is active and the headlamps are in high beam mode. The three parameters, rotation of the steering wheel, angle of the steering wheel and navigation system, can be taken into account individually or all three at the same time in order to switch off the DBL bending light function.

The fifth line, according to a third embodiment, shows that the DBL bending light function logic is changed when the automatic switching system between the high beam and low beam lighting modes is active and the headlamps are in high beam mode (headlamp flashing activated state).

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A method for controlling at least one vehicle headlamp, said at least one vehicle headlamp being equipped with an automatic switching unit between high beam and low beam lighting modes and with a DBL bending light function that causes said at least one vehicle headlamp to move in response to a turn or bend in a road, wherein said method comprises the steps of:

detecting a combination of conditions comprising an active state of the automatic switching unit between high beam and low beam lighting modes and an active state of the high beam lighting mode; said bending light function being capable of automatically controlling movement of said at least one headlamp, wherein during said bending light function, an angular position of said at least one vehicle headlamp is moved when it is active or said at least one vehicle headlamp is not moved when said bending light function is inactive;

wherein if it is detected during said detecting step that said at least one vehicle headlamp is in said high beam mode and said automatic switching unit is active, then at least one of the following steps is performed: (i) causing said state of said bending light function to be changed from a first active state to at least one second state, wherein said at least one second state is an inactive state or (ii) changing a logic controlling the bending light function so that angular position and movement of said at least one vehicle headlamp is controlled.

2. The method for controlling at least one headlamp according to claim 1, wherein said first state of the DBL bending light function is a default state.

3. The method for controlling at least one headlamp according to claim 2, wherein said at least a second state of the DBL bending light function is an inactive state.

4. The method for controlling at least one headlamp according to claim 2, wherein said at least a second state of the DBL bending light function is an active state different from the first state.

5. The method for controlling at least one headlamp according to claim 2, wherein the combination of conditions comprises a wheel angle.

6. The method for controlling at least one headlamp according to claim 2, wherein the combination of conditions comprises detecting a bend with an amplitude greater than a predetermined value.

7. The method for controlling at least one headlamp according to claim 1, wherein said at least a second state of the DBL bending light function is an inactive state.

8. The method for controlling at least one headlamp according to claim 7, wherein the combination of conditions comprises a wheel angle.

9. The method for controlling at least one headlamp according to claim 7, wherein the combination of conditions comprises detecting a bend with an amplitude greater than a predetermined value.

10. The method for controlling at least one headlamp according to claim 1, wherein said at least a second state of the DBL bending light function is an active state different from the first state.

11. The method for controlling at least one headlamp according to claim 1, wherein the combination of conditions comprises a wheel angle.

12. The method for controlling at least one headlamp according to claim 1, wherein the combination of conditions comprises detecting a bend with an amplitude greater than a predetermined value.

13. A road lighting system mounted to a vehicle comprising:
at least one headlamp comprising a DBL bending light function to illuminate the road in bends, said bending light function causing said at least one headlamp to move in response to a bend;
a microcontroller being connected to a data network of the vehicle and controlling the orientation of said at least one headlamp;
a camera able to supply obstacle detection data placed in front of the vehicle;
an automatic switching unit between high beam and low beam lighting modes receiving data from said camera;
said microcontroller being adapted to determine a combination of conditions comprising an active state of the automatic switching unit between high beam and low beam lighting modes and an active state of the high beam lighting mode said bending light function being capable of automatically controlling movement of said at least one headlamp, wherein during said bending light function, an angular position of said at least one headlamp is moved when it is active or said at least one headlamp is not moved when said bending light function is inactive;
wherein if it is determined that said at least one vehicle headlamp is in said high beam mode and said automatic switching unit is active, then said microcontroller performs at least one of the following steps: (i) causing said state of said bending light function to be changed from a first active state or (ii) changing a logic controlling the bending light function so that said angular position and movement of said at least one vehicle headlamp is controlled.

14. The road lighting system according to claim 13, wherein said first state of the DBL bending light function is a default state.

15. The road lighting system according to claim 14, wherein said at least a second state of the DBL bending light function is an inactive state.

16. The road lighting system according to claim 14, wherein said at least a second state of the DBL bending light function is an active state different from a first state.

17. The road lighting system according claim 14, wherein a combination of conditions comprises a wheel angle.

18. The road lighting system according to claim 13, wherein said at least a second state of the DBL bending light function is an inactive state.

19. The road lighting system according to claim 13, wherein said at least a second state of the DBL bending light function is an active state different from the first state.

20. The road lighting system according claim 13, wherein the combination of conditions comprises a wheel angle.

21. The road lighting system according to claim 13, wherein the combination of conditions comprises detecting a bend with an amplitude greater than a predetermined value.

22. The road lighting system according to claim 13, wherein it comprises two headlamps, and in that said at least a second state is defined by rotation of the beam of a first headlamp at a first angle and by rotation of the beam of a second headlamp at a second angle different from the first angle.

23. The road lighting system according to claim 13, wherein it comprises two headlamps, and in that said at least a second state is defined by rotation of the beam of a first headlamp and the absence of rotation of the beam of a second headlamp.

* * * * *

UNITED STATES PATENT AND TRADEMARK OFFICE
CERTIFICATE OF CORRECTION

| | | |
|---|---|---|
| PATENT NO. | : 8,757,853 B2 | Page 1 of 1 |
| APPLICATION NO. | : 12/893066 | |
| DATED | : June 24, 2014 | |
| INVENTOR(S) | : Caroline Robert et al. | |

It is certified that error appears in the above-identified patent and that said Letters Patent is hereby corrected as shown below:

In the claims

Claim 1, column 6, line 67, before "angular" insert -- said --.

Claim 13, column 8, line 14, after "state" insert -- to at least one second state, wherein said at least one second state is an inactive state --.

Signed and Sealed this
Twenty-second Day of December, 2015

Michelle K. Lee
*Director of the United States Patent and Trademark Office*